Figure 1:
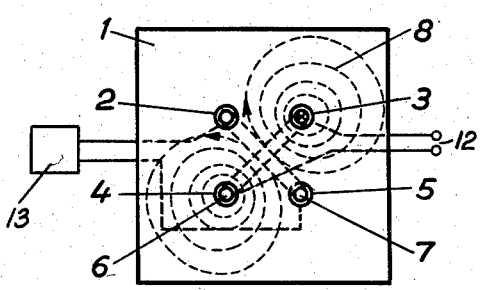

July 21, 1959

O. DAHLE ET AL 2,895,332

MEANS FOR MEASURING MECHANICAL FORCES AND THEIR TIME DERIVATIVES

Filed Dec. 14, 1954

2 Sheets-Sheet 1

Inventors.
ORVAR DAHLE and
BIRGIT DAHLE, nee ANDERSSON
By
Attorney.

Inventors.
ORVAR DAHLE and
BIRGIT DAHLE, nee ANDERSSON
By
Attorney.

United States Patent Office

2,895,332
Patented July 21, 1959

2,895,332

MEANS FOR MEASURING MECHANICAL FORCES AND THEIR TIME DERIVATIVES

Orvar Dahle and Birgit Dahle nee Andersson, Vasteras, Sweden, assignors to Allmanna Svenska Elektriska Aktiebolaget, Vasteras, Sweden, a corporation of Sweden Application December 14, 1954, Serial No. 475,142

Claims priority, application Sweden December 28, 1953

9 Claims. (Cl. 73—141)

In methods of measuring mechanical forces as hitherto normally used, the point of application of the force to be measured is displaced a certain distance, the measurement being based upon this displacement. The measurement of mechanical forces in mechanically rigid constructions where the active forces do not bring about any appreciable deformation, has therefore hitherto involved great difficulties. An example thereof is the measurement of the thrust between the rollers in a mill frame. It is evident also, that the weighing of heavy weights, for instance ore trucks, would offer great advantages, if the weighing could be performed by means of a structure without moving parts.

In the first mentioned case, due to the extremely small deformation involved, it has heretofore been necessary to use extremely sensitive measuring devices for measuring the displacement of the point of application of the force. Such a device is the so called strain gauge, which is based upon the variation in the resistance of a thin wire as it is subjected to mechanical tensile or compressive stresses. The measurement, therefore, is performed electrically, as is also the case in some other measuring methods heretofore suggested. All these methods, however, have the drawback that the available powers resulting from measurement are very small, so that amplification often has to be employed before the measuring result can be read or recorded by an instrument or fed to a control device.

The present invention provides means for the solution of the above mentioned measuring problem and for obtaining measuring results having sufficiently great powers for measuring or recording the same by means of electrical instruments or for causing such powers to influence a control means without any amplification. The invention is based on a property of magnetic material which is usually called magneto-striction, i.e. when magnetic material is subjected to mechanical strain, the permeability is altered in the direction of the strain. Two different kinds of magneto-striction may occur, viz. the positive and the negative magneto-striction. The positive magneto-striction which occurs for instance in Permalloy, means that the permeability increases for tensile stressing, whereas the negative magneto-striction occurring for instance, in nickel means that the permeability decreases for tensile stressing. Ordinary iron has a positive or negative magneto-striction depending on the degree of magnetization.

The invention provides a structure substantially characterized by a measuring body which is entirely or partly surrounded by two coils, the winding planes of which are arranged so that the mutual inductance of the coils is zero, when the measuring body is unstressed. The one coil, connected to an electric current source, magnetizes the material thus producing a voltage in the other coil due to the differing permeability in different directions of the material arising when the body is subjected to forces to be measured. The voltage across the latter coil will then be a measure of the mechanical strain within the measuring body and therefore a measure of the mechanical force acting on it.

Figure 2:
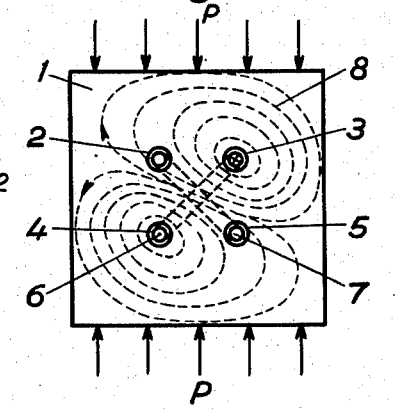

The present invention will be described reference being made to the accompanying drawings, wherein Figs. 1 and 2 show a measuring body according to the invention in unstressed and stressed conditions, respectively, Figs. 3 through 6 show different forms of measuring devices according to the invention.

The mode of action of the invention is illustrated by Fig. 1, which shows a measuring body 1 of magnetic material having four openings or ducts 2, 3, 4 and 5. In two of the ducts (3 and 4) there is wound an exciting coil 6 connected to a source 12 of electric current source and in the other two ducts (2 and 5) is a measuring coil 7 connected to a voltage sensing device 13. The coils are shown in the figure with only one turn each, for the sake of simplicity, but obviously there may be more turns. When the exciting coil 6 is traversed by electric current in the direction shown on the figure, a magnetic flux 8 is produced in the measuring body. Since the winding plane of the measuring coil 7 lies at right angles to that of the exciting coil 6, the net flux through the coil 7 will be zero so that no voltage is induced in this measuring coil. If now a mechanical force P is allowed to act on the measuring body 1 in a manner indicated by the arrows in Fig. 2, and if the measuring body 1 is assumed to be of a material having positive magneto-striction, the permeability of the material will decrease in the vertical direction, and increase in the horizontal direction. This results in a change in the direction of the magnetic flux lines in the measuring body, and, as the effect of the changes in the permeability is most pronounced at the center of the measuring body where the flux density is greatest, the flux lines in the stressed measuring body will be deformed as shown in Fig. 2 in which the measuring coil 7 embraces a part of the flux so that a voltage is induced in it, the magnitude of the voltage depends on the angle through which the flux lines have been turned. Since the voltage induced in the measuring coil 7 is proportional to the time derivative of the magnetic flux, it is necessary that for measuring the magnitude of the mechanical force P the exciting current in the coil 6 is an alternating current. If the exciting current were a direct current, the voltage induced in the measuring coil 7 would be a measure for the time derivative of the mechanical force P.

Figure 3:
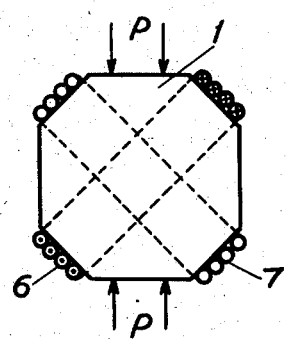

The practical construction of the measuring body need not, of course, follow exactly the embodiments shown schematically in Figs. 1 and 2, but it may be shaped in different manners, such as an octagon as shown in Fig. 3, for instance. Also the coils need not be placed within openings or ducts in the inner part of the measuring body but they may embrace it, as shown in Fig. 3. In the last mentioned case, the measuring body becomes mechanically strong and easy to manufacture, but the magnetic flux has to traverse in this case rather large air gaps, so that the exciting coil draws a heavy current and rather small sensitivity is attained. Furthermore it is not necessary that the winding planes of the coils lie at right angle to each other, but it is essential that the mutual inductance of the coils is zero when the measuring body is unstressed.

Figure 4:
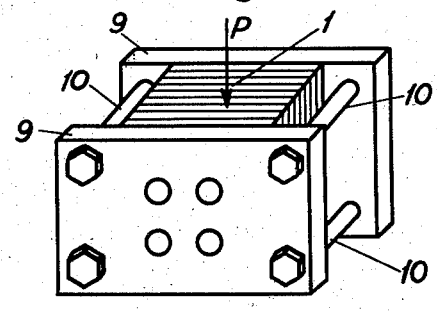

If the excitation is effected by alternating current, it is of course suitable that the measuring body shall be composed of a plurality of thin sheets or laminae of magnetic material stacked one upon another. The measuring body may then be held together by bolts inserted within punched holes in the laminae. These holes and bolts, however, would disturb the magnetic flux distribution in the measuring body, it is thus better to place one rigid plate on each side of the measuring body, between which plates the sheets of the measuring body are pressed together by bolts located outside the measuring body itself. Fig. 4 shows such a construction, wherein 1 is the measuring body, held between two plates 9 by means of a plurality of bolts 10. This construction has however the drawback that a certain mechanical hysteresis effect occurs due to the friction forces occurring between the plates and the measuring body. This hysteresis, however, can be eliminated by bonding the sheets with a suitable synthetic resin.

Obviously, the applicability of the invention is not restricted to compressive forces, as shown in Fig. 2, but tensile forces have, as will be seen from the second paragraph of the description, a similar influence on the magnetic material. The measuring body should of course be so shaped that the tensile force can be applied. It is also possible to apply the mechanical force parallel to the plane of the coils, i.e. at right angle to the plane of the sheets so that bending stresses occur in the measuring body.

Figure 5:
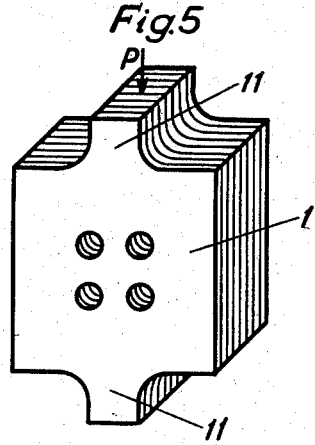

In the measurement of compressive forces, it is very difficult to obtain an even distribution of the applied force over the whole cross-section of the measuring body as shown in Fig. 2. The results of measurement are greatly dependent on whether the force really is evenly distributed over the surface, and the surfaces of the measuring body and the surfaces between which it is pressed must be very smooth, parallel, and absolutely rigid. The sensitivity of the distribution of the load involves the risk that the results of the measurement cannot be reproduced. It will also be seen from Fig. 2 that the compressive stress obtained in those parts of the measuring body which lie outside the coils has an action opposed to the desired action. Another drawback is that the material around the ducts 2, 3, 4 and 5 in which the coils are inserted is subjected to the strongest mechanical stresses. Should therefore the measuring body be overloaded, the material around these ducts would flow with the result that permanent stresses would be produced which would alter the magnetic properties of the measuring body and also the results of measurement. These disadvantages may be eliminated by providing both surfaces of the measuring body, which are subjected to the mechanical force, with projections on which the mechanical force acts. Fig. 5 of the drawing shows in principle such a measuring body, in which 1 designates the body itself having two projections 11. These serve as equalising distance pieces so that the force is evenly distributed at their base independently of how the force is applied to their free ends. At the same time the force by this construction is concentrated to the center of the measuring body, whereby greater sensitivity is obtained. The projections are suitably dimensioned so that on the occurrence of an overload the flow takes place in them earlier than at the edges of the holes, so that they serve as a mechanical overload protection. Therefore it is also suitable that the transition between the measuring body and the projections is made gradual, since otherwise indefinite mechanical stresses would be obtained within the magnetically active parts of the measuring body. This construction is also suitable for the measurement of tensile forces, if the projections are shaped so that a tensile force can be applied.

Figure 6:
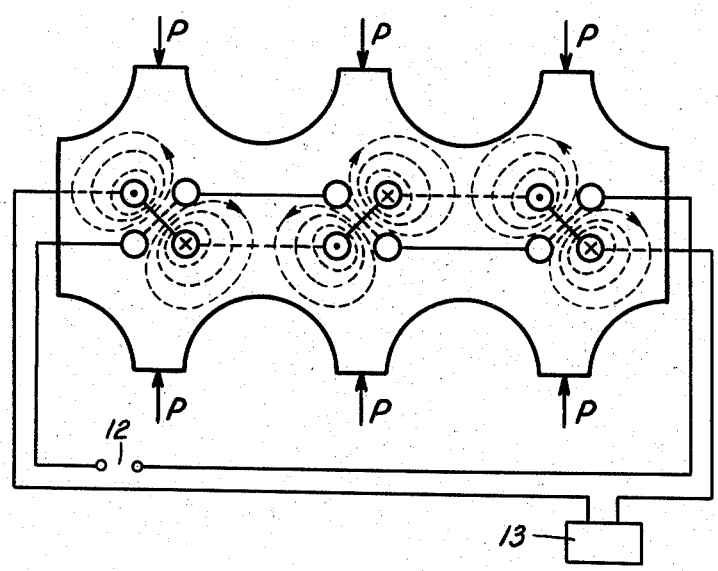

It is of course also possible to increase the dimensions of the measuring body in proportion to the magnitude of the force to be measured. As the measuring body, however, must have a substantially symmetrical cross-section at right angles to the slots, this involves a too high construction for large forces. Therefore it is more suitable to place a plurality of small measuring bodies side by side, so that each of them takes up a part of the mechanical force, and to series connect their measuring coils for obtaining a measure for the sum of the forces taken up by them. In order to get a mechanically stable and strong construction, a plurality of measuring bodies lying side by side may be punched in the same sheets, so that when they are assembled, a plurality of measuring bodies forming a common mechanical unit is obtained. The exciting coils should then be suitably connected so that the different measuring bodies do not disturb each other magnetically. Fig. 6 shows schematically such a construction, wherein both the exciting and the measuring coils are series connected in such a manner that the magnetic fields do not disturb each other and that the results of measurement from the different measuring bodies are added.

If the coils of a plurality of measuring bodies are series connected as described above, it is necessary for obtaining proper adding that either all the measuring bodies are influenced by equal mechanical forces, which is difficult to obtain, or that a constant ratio exists between the voltage induced in the measuring coil and the mechanical force applied. This rectilinear relationship between force and measuring voltage may be obtained with rather good accuracy, if a suitable value of the exciting current is chosen, and particularly if only the fundamental wave of the voltage induced in the measuring coils is measured. Suitably the exciting current is chosen so heavy that saturation occurs in those parts of the measuring body which are embraced by the coils.

Due to the above mentioned projections on the measuring body, a magnetic asymmetry is produced in consequence of which a certain voltage is induced in the measuring coil, even if the measuring body is mechanically unstressed. This zero-voltage may also depend on other factors, for instance on the asymmetry of the holes in the body, or on the fact that the sheets are manufactured from rolled material, which always possesses a certain magnetic anisotropy. It is, however, possible to eliminate this zero-voltage by changing the angle between the winding planes of the coils and thereby their mutual inductance.

However, it is also rather easy to compensate electrically the zero-voltage by an additional voltage, which of course has to be variable with respect to amplitude and phase angle. This additional voltage may be obtained from an external voltage source but also from an additional winding inserted in the same slots as the exciting coil.

We claim as our invention:

1. A means of the character described for measuring the time derivative of a mechanical force, comprising a measuring body of magnetostrictive material, means for applying said force to said measuring body, two coils embracing at least a part of said body, the winding planes of said coils being disposed at right angles to each other and at substantially 45° to the direction of said force and so arranged that the mutual inductance of said coils is substantially zero when the measuring body is mechanically unloaded, a direct current source connected to one of said coils which serves as an exciting coil, and a voltage sensing means connected to the other coil which serves as a measuring coil.

2. A means of the character described for measuring mechanical forces comprising a measuring body composed of a plurality of sheets of magnetic material having holes therein which form ducts when the sheets are stacked upon each other, an exciting coil connected to an electric current source, and a measuring coil connected to a voltage sensitive device, said coils being mounted in said ducts and the winding planes of said coils being arranged substantially perpendicularly to each other and the mechanical forces being applied to the measuring body in a direction substantially parallel to the plane of said sheets and at an angle of substantially 45° to the winding planes of said coils.

3. A means according to claim 2, in which the measuring body is provided with two oppositely disposed projections of smaller end width than said body for the application of the mechanical force to said body, said projections having a steadily increasing section towards said measuring body.

4. A means according to claim 3, in which a plurality of measuring bodies form a coherent unit.

5. A means of the character described for measuring mechanical forces, comprising a measuring body of magnetostrictive material, said measuring body being provided with four substantially parallel ducts, two coils each threaded through a pair of said ducts and linking said body so that the two coils form a cross-like pattern, means for applying said forces to said measuring body so that at least a component of force is exerted in a direction which lies in a plane at an angle of substantially 45° to the winding planes of said coils, an alternating current source connected to one of said coils, and a voltage sensing means connected to the other coil.

6. A means according to claim 5, in which said measuring body is a laminated magnetic structure composed of sheets of magnetic material bonded together by a synthetic resin, the planes of said sheets being substantially perpendicular to said ducts and substantially parallel to said mechanical stresses produced by said forces.

7. A means according to claim 6, in which the measuring body is provided with two oppositely disposed projections of smaller end width than said body for the application of the mechanical forces of said body, said projections having a steadily increasing cross-section towards said body.

8. A means according to claim 7, in which a plurality of measuring bodies form a coherent unit.

9. A means according to claim 1, in which said measuring body is built up from sheets of magnetic material, the planes of said sheets being substantially perpendicular to the winding planes of said coils and substantially parallel to the direction of said force.

References Cited in the file of this patent

UNITED STATES PATENTS

| | | |
|---|---|---|
| 1,666,680 | Buckley | Apr. 17, 1928 |
| 2,370,845 | Davis | Mar. 6, 1945 |
| 2,553,833 | Rifenbergh | May 22, 1951 |
| 2,557,393 | Rifenbergh | June 19, 1951 |

FOREIGN PATENTS

| | | |
|---|---|---|
| 442,441 | Great Britain | Feb. 3, 1936 |
| 658,569 | Germany | Apr. 11, 1938 |